United States Patent
Briggs

(10) Patent No.: US 9,995,122 B2
(45) Date of Patent: Jun. 12, 2018

(54) DUAL FUEL BURNER

(71) Applicant: Adler Hot Oil Service, LLC, Vernal, UT (US)

(72) Inventor: Paul Briggs, Vernal, UT (US)

(73) Assignee: Adler Hot Oil Service, LLC, Vernal, UT (US)

(*) Notice: Subject to any disclaimer, the term of this patent is extended or adjusted under 35 U.S.C. 154(b) by 278 days.

(21) Appl. No.: 14/713,677

(22) Filed: May 15, 2015

(65) Prior Publication Data

US 2016/0053991 A1    Feb. 25, 2016

Related U.S. Application Data

(63) Continuation of application No. 14/509,636, filed on Oct. 8, 2014, now Pat. No. 9,057,517.

(Continued)

(51) Int. Cl.
*F23D 23/00* (2006.01)
*E21B 43/24* (2006.01)
(Continued)

(52) U.S. Cl.
CPC ............. *E21B 43/24* (2013.01); *B60P 3/224* (2013.01); *E21B 33/03* (2013.01); *E21B 36/00* (2013.01);
(Continued)

(58) Field of Classification Search
CPC ......... F23D 14/045; F23D 2900/14641; F23D 17/00; F23D 23/00
See application file for complete search history.

(56) References Cited

U.S. PATENT DOCUMENTS

| 408,073 A | 7/1889 | Bell |
| 1,660,018 A * | 2/1928 | Steffen .................... F23D 14/10 239/419.5 |

(Continued)

FOREIGN PATENT DOCUMENTS

| CA | 1294564 C | 1/1992 |
| CA | 2079536 A1 | 2/1994 |

(Continued)

OTHER PUBLICATIONS

EP 1484554 A1—English machine translation.*

(Continued)

*Primary Examiner* — Jorge Pereiro
(74) *Attorney, Agent, or Firm* — Conley Rose, P.C.; Grant Rodolph

(57) ABSTRACT

Systems and methods are disclosed that may include providing a dual fuel burner in a superheater truck to burn wellhead gas produced from a wellhead in a first fuel burner and burn at least one of methane, ethane, propane, butane, gasoline, diesel, liquified natural gas (LNG), natural gas liquids (NGLs), and wellhead gas in a second fuel burner to heat water and/or other chemicals used in hydrocarbon production and/or well completion processes, including, but not limited to hydraulic fracturing (fracking). The first fuel burner may be integrated with the second fuel burner such that fuel rail fingers of the first fuel burner are interstitially spaced with fuel rail fingers of the second fuel burner. The first fuel burner and the second fuel burner may be operated independently from each other. The first fuel burner and the second fuel burner may alternatively be operated simultaneously with each other.

20 Claims, 6 Drawing Sheets

Related U.S. Application Data

(60) Provisional application No. 62/039,343, filed on Aug. 19, 2014.

(51) Int. Cl.

| | | |
|---|---|---|
| *F23C 1/08* | (2006.01) | |
| *E21B 41/00* | (2006.01) | |
| *F23C 5/08* | (2006.01) | |
| *F23D 14/26* | (2006.01) | |
| *E21B 33/03* | (2006.01) | |
| *E21B 36/00* | (2006.01) | |
| *E21B 36/02* | (2006.01) | |
| *E21B 43/34* | (2006.01) | |
| *B60P 3/22* | (2006.01) | |
| *E21B 43/26* | (2006.01) | |
| *F22B 1/00* | (2006.01) | |
| *F23G 7/06* | (2006.01) | |

(52) U.S. Cl.
CPC ........ *E21B 36/025* (2013.01); *E21B 41/0071* (2013.01); *E21B 43/2405* (2013.01); *E21B 43/26* (2013.01); *E21B 43/34* (2013.01); *F22B 1/00* (2013.01); *F23C 1/08* (2013.01); *F23C 5/08* (2013.01); *F23D 14/26* (2013.01); *F23G 7/06* (2013.01); *F23N 2037/08* (2013.01)

(56) References Cited

U.S. PATENT DOCUMENTS

| | | | |
|---|---|---|---|
| 1,757,847 A | | 5/1930 | Shutt |
| 1,791,565 A | | 2/1931 | Killam |
| 1,896,092 A | | 2/1933 | Mangiameli |
| 1,938,851 A | | 12/1933 | McKee |
| 2,017,867 A | | 10/1935 | Nantz |
| 2,155,340 A | | 4/1939 | Stroud |
| 2,403,431 A | | 7/1946 | Dobrin |
| 2,592,911 A | | 4/1952 | Ketelsen |
| 2,682,752 A | | 7/1954 | Branson |
| 2,784,747 A | | 3/1957 | Weempe |
| 2,935,128 A | | 5/1960 | Ferguson |
| 3,106,915 A | | 10/1963 | Key, Jr. |
| 3,159,345 A | † | 12/1964 | Osburn |
| 3,254,711 A | | 6/1966 | Parker |
| 3,342,241 A | | 9/1967 | Whitesides |
| 3,401,673 A | | 9/1968 | Key, Jr. |
| 3,410,347 A | | 11/1968 | Triplett et al. |
| 3,474,596 A | | 10/1969 | Scott et al. |
| 3,894,834 A | | 7/1975 | Estes |
| 3,980,137 A | | 9/1976 | Gray |
| 4,118,925 A | | 10/1978 | Sperry et al. |
| 4,235,325 A | | 11/1980 | Miller |
| 4,336,839 A | | 6/1982 | Wagner et al. |
| 4,366,860 A | | 1/1983 | Donaldson et al. |
| 4,398,961 A | | 8/1983 | Mason |
| 4,421,062 A | | 12/1983 | Padilla, Sr. |
| 4,475,883 A | | 10/1984 | Schirmer et al. |
| 4,576,005 A | | 3/1986 | Force |
| 4,597,437 A | | 7/1986 | McNabb |
| 4,689,053 A | | 8/1987 | Heath |
| 4,737,100 A | | 4/1988 | Schnell et al. |
| 4,779,677 A | | 10/1988 | Cobb |
| 4,819,955 A | | 4/1989 | Cobb |
| 4,861,263 A | | 8/1989 | Schirmer |
| 4,878,480 A | | 11/1989 | Watson et al. |
| 4,960,222 A | | 10/1990 | Fields, III |
| 4,962,784 A | | 10/1990 | Collins |
| 5,042,582 A | | 8/1991 | Rajewski |
| 5,055,030 A | | 10/1991 | Schirmer |
| 5,132,011 A | | 7/1992 | Ferris |
| 5,205,250 A | | 4/1993 | Easterly et al. |
| 5,295,817 A | | 3/1994 | Young |
| 5,295,820 A | | 3/1994 | Bilcik et al. |
| 5,349,992 A | | 9/1994 | Gallo et al. |
| 5,464,005 A | * | 11/1995 | Mizrahi ............ F24C 15/30 126/24 |
| 5,497,561 A | | 3/1996 | Murray, Sr. et al. |
| 5,656,136 A | | 8/1997 | Gayaut et al. |
| 5,832,999 A | | 11/1998 | Ellwood |
| 5,863,510 A | | 1/1999 | Pozniak et al. |
| 5,884,709 A | | 3/1999 | Evans et al. |
| 5,900,137 A | | 5/1999 | Homan |
| 5,960,826 A | | 10/1999 | Hebblethwaite et al. |
| 5,983,962 A | | 11/1999 | Gerardot |
| 6,014,995 A | | 1/2000 | Agnew |
| 6,112,760 A | | 9/2000 | Scott et al. |
| 6,129,148 A | | 10/2000 | Meeks |
| 6,955,704 B1 | | 10/2005 | Strahan |
| 6,962,199 B1 | | 11/2005 | Tjeenk Willink |
| 6,990,930 B2 | | 1/2006 | Sarkar |
| 7,048,051 B2 | | 5/2006 | McQueen |
| 7,140,873 B1 | | 11/2006 | House |
| 7,165,572 B2 | | 1/2007 | Hebblethwaite |
| 7,219,500 B1 | | 5/2007 | Rhodes |
| 7,255,540 B1 | | 8/2007 | Cooper |
| 7,520,743 B1 | | 4/2009 | Roberts |
| 7,575,672 B1 | † | 8/2009 | Gilmore |
| 7,681,536 B2 | | 3/2010 | Kaupp |
| 7,721,557 B1 | | 5/2010 | Stearns |
| 7,857,898 B2 | | 12/2010 | Wiggins et al. |
| 8,021,537 B2 | | 9/2011 | Sarkar et al. |
| 8,133,300 B1 | | 3/2012 | Gonsalves, III et al. |
| 8,171,993 B2 | | 5/2012 | Hefley |
| 8,205,674 B2 | | 6/2012 | Shurtleff |
| 8,207,621 B2 | | 6/2012 | Hunter |
| 8,262,866 B2 | | 9/2012 | Lockhart et al. |
| 8,312,924 B2 | | 11/2012 | Smith |
| 8,534,235 B2 | | 9/2013 | Chandler |
| 8,733,437 B2 | | 5/2014 | Ware et al. |
| 8,807,256 B2 | | 8/2014 | Gibb et al. |
| 8,905,138 B2 | | 12/2014 | Lundstedt et al. |
| 9,057,517 B1 | | 6/2015 | Briggs |
| 9,091,160 B2 | | 7/2015 | Renick et al. |
| 9,140,110 B2 | | 9/2015 | Coll et al. |
| 2003/0178195 A1 | | 9/2003 | Agee et al. |
| 2003/0225169 A1 | | 12/2003 | Yetman |
| 2006/0065400 A1 | | 3/2006 | Smith |
| 2006/0162924 A1 | | 7/2006 | Blevins et al. |
| 2006/0272503 A1 | | 12/2006 | Adam et al. |
| 2007/0056726 A1 | | 3/2007 | Shurtleff |
| 2007/0062704 A1 | | 3/2007 | Smith |
| 2009/0029303 A1 | | 1/2009 | Wiggins |
| 2009/0066091 A1 | | 3/2009 | Hunter |
| 2009/0314384 A1 | | 12/2009 | Brakefield et al. |
| 2010/0000508 A1 | | 1/2010 | Chandler |
| 2010/0065267 A1 | | 3/2010 | Lantz |
| 2010/0071899 A1 | | 3/2010 | Coquilleau et al. |
| 2010/0181069 A1 | | 7/2010 | Schneider et al. |
| 2010/0242732 A1 | | 9/2010 | Saville |
| 2010/0294494 A1 | | 11/2010 | Hefley |
| 2011/0094385 A1 | | 4/2011 | Gates |
| 2011/0198083 A1 | | 8/2011 | Lockhart et al. |
| 2011/0211818 A1 | | 9/2011 | Grady |
| 2012/0094242 A1 | * | 4/2012 | Streisel ............ F23D 14/045 431/278 |
| 2012/0152531 A1 | | 6/2012 | Cerenzie |
| 2012/0186781 A1 | | 7/2012 | Dreyer |
| 2012/0193093 A1 | | 8/2012 | James |
| 2012/0285896 A1 | | 11/2012 | Black |
| 2012/0325751 A1 | | 12/2012 | Renick et al. |
| 2013/0139694 A1 | | 6/2013 | Hughes et al. |
| 2013/0228330 A1 | | 9/2013 | Loree et al. |
| 2013/0288187 A1 | * | 10/2013 | Imgrundt ............ F23D 14/26 431/258 |
| 2013/0312972 A1 | | 11/2013 | Lundstedt et al. |
| 2014/0096974 A1 | | 4/2014 | Coli et al. |
| 2014/0130498 A1 | | 5/2014 | Randolph |
| 2014/0151047 A1 | | 6/2014 | Chandler |
| 2014/0190698 A1 | | 7/2014 | Mays |
| 2014/0262735 A1 | | 9/2014 | Hawks |
| 2015/0132703 A1 | | 5/2015 | Noman et al. |
| 2016/0053580 A1 | | 2/2016 | Briggs |

(56) References Cited

U.S. PATENT DOCUMENTS

| | | | |
|---|---|---|---|
| 2016/0053581 A1 | 2/2016 | Briggs | |
| 2016/0131361 A1 | 5/2016 | Skachkov et al. | |
| 2016/0138826 A1* | 5/2016 | La Porte | F24H 1/06 122/17.1 |

FOREIGN PATENT DOCUMENTS

| | | | | |
|---|---|---|---|---|
| CA | 2468012 A1 | | 11/2004 | |
| CA | 2499699 A1 | | 3/2006 | |
| CA | 2546315 A1 | | 11/2006 | |
| CA | 2570719 A1 | | 6/2008 | |
| CA | 2633332 A1 | | 12/2008 | |
| CA | 2671043 A1 | | 1/2010 | |
| CA | 2754347 A1 | | 3/2011 | |
| CA | 2706399 A1 | | 11/2011 | |
| CA | 2723639 A1 | | 5/2012 | |
| CA | 2728035 A1 | | 6/2012 | |
| CA | 2762244 A1 | | 8/2012 | |
| CA | 2773843 A1 | | 10/2012 | |
| CA | 2792323 | † | 4/2014 | |
| CA | 2792323 A1 | | 4/2014 | |
| CA | 2851304 A1 | | 12/2014 | |
| EP | 1484554 A1 | * | 12/2004 | F23D 14/045 |
| JP | 62123209 A | | 6/1987 | |
| WO | 2009009336 A2 | | 1/2009 | |
| WO | 2012100320 A1 | | 8/2012 | |
| WO | 2013016685 A1 | | 1/2013 | |
| WO | 2014006165 A2 | | 1/2014 | |
| WO | 2014053056 A1 | | 4/2014 | |
| WO | 2014075071 A2 | | 5/2014 | |
| WO | 2014096030 A1 | | 6/2014 | |
| WO | 2014/197969 | † | 12/2014 | |
| WO | 2014197969 A1 | | 12/2014 | |

OTHER PUBLICATIONS

Foreign Communication From A Counterpart Application, Canadian Application No. 2891683, Canadian Office Action dated Jul. 13, 2015, 2 pages.

Office Action dated Apr. 28, 2016, 5 pages, U.S. Appl. No. 14/509,647, filed Oct. 8, 2014.

"Orifice Chart—Natural Gas," available at http://web.archive.org/web/20011204074048/http://heaterradiants.com/Orifice.htm, uploaded on Dec. 4, 2001.

Screenshots of YouTube video entitled "Frac Heater," available at https://www.youtube.com/watch?v=4mOaMpN2yDM, uploaded on Feb. 17, 2011.

Office Action dated Feb. 9, 2017, 9 pages, U.S. Appl. No. 14/509,647, filed Oct. 8, 2014.

Office Action dated Jun. 5, 2017, 37 pages, U.S. Appl. No. 14/509,642, filed Oct. 8, 2014.

Office Action dated Apr. 13, 2017, 4 pages, U.S. Appl. No. 14/509,647, filed Oct. 8, 2014.

Office Action dated Sep. 22, 2016, 19 pages, U.S. Appl. No. 14/509,647, filed Oct. 8, 2014.

Office Action dated Jun. 1, 2017, 8 pages, U.S. Appl. No. 14/509,647, filed Oct. 8, 2014.

Office Action dated Dec. 2, 2014, 20 pages, U.S. Appl. No. 14/509,636, filed Oct. 8, 2014.

Notice of Allowance dated Mar. 26, 2015, 9 pages, U.S. Appl. No. 14/509,636, filed Oct. 8, 2014.

Azzopardi, Barry, J.; "Contraction, Flow and Pressure Loss in"; Thermopedia; http://www.thermopedia.com/content/659/; Feb. 2, 2011; 1 page.

Petrowiki; "Pressure Drop Evaluation Along Pipelines"; http://petrowiki.org/Pressure_drop_evaluation_along_pipelines; Jun. 8, 2015; 23 pages.

Hyer, G., "Your Energy Management Partner," Williston Basin Petroleum Conference, May 2, 2013, 12 pages.

Notice of Allowance dated Sep. 11, 2017, 8 pages, U.S. Appl. No. 14/509,642, filed Oct. 8, 2014.

Final Office Action dated Sep. 6, 2017, 9 pages, U.S. Appl. No. 14/509,647, filed Oct. 8, 2014.

Scott, M., "Overview of Production Facilities and Commingling," Texas General Land Office, Sep. 30, 2015, 43 pages.

Office Action dated Jan. 25, 2017, 41 pages, U.S. Appl. No. 14/509,642, filed Oct. 8, 2014.

Notice of Allowance dated Jan. 17, 2018, 10 pages, U.S. Appl. No. 14/509,642, filed Oct. 8, 2014.

Advisory Action dated Dec. 5, 2017, 12 pages, U.S. Appl. No. 14/509,647, filed Oct. 8, 2014.

Office Action dated Dec. 19, 2017, 9 pages, U.S. Appl. No. 14/509,647, filed Oct. 8, 2014.

Kikukawa, Shigeki, et al., "Risk Assessment for Liquid Hydrogen Fueling Stations," International Journal of Hydrogen Energy, vol. 34, Issue 2, Jan. 2009, 7 pages.

Barnes, Jim, "New Oil and Gas Production System Design Slashes Installation Time and Costs," Engineered Concepts, LLC, Aug. 8, 2012, 3 pages.

Emerson Process Management, "Flow Solutions Guide: Vertical Heater Treater Optimization," May 2014, 4 pages.

Office Action dated Apr. 3, 2018, 10 pages, U.S. Appl. No. 14/509,647, filed Oct. 8, 2014.

Office Action dated Apr. 17, 2018; 49 pages, U.S. Appl. No. 15/187,395, filed Jun. 20, 2016.

Nonfinal Office Action dated Dec. 2, 2014 for U.S. Appl. No. 14/509,636.†

* cited by examiner
† cited by third party

DUAL FUEL BURNER

CROSS-REFERENCE TO RELATED APPLICATIONS

The present application is a continuation of the prior-filed and co-pending U.S. patent application Ser. No. 14/509,636 filed on Oct. 8, 2014 by Briggs and entitled "Dual Fuel Burner," which claims priority under 35 U.S.C. § 119(e) to U.S. Provisional Patent Application No. 62/039,343 filed on Aug. 19, 2014 by Briggs and entitled "Wellhead Gas Heater," the disclosures of which are hereby incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional frac heaters are generally equipped with propane or diesel fired heater units. These propane or diesel fired heater units are designed to operate at well sites and heat water and/or other chemicals used for hydrocarbon production and/or well completion processes (i.e. fracking). Because large volumes of water are typically needed during fracking, large amounts of propane or diesel fuel are also needed to heat such large amounts of water. However, the cost of propane has increased exponentially in recent years, thereby escalating the associated production and/or well completion expenses. Typically, gas produced from the wellhead (referred to as "wellhead gas," "field gas," or "dirty gas"), can experience rapid pressure fluctuations and is often contaminated with other chemicals. Due to the fluctuation of the wellhead gas pressure and contamination levels of the wellhead gas, previous attempts to use the wellhead gas to heat the water and/or other chemicals required for production and/or well completion processes have failed. Thus, wellhead gas is generally considered a byproduct and is burned off and/or flared in many instances.

SUMMARY

In some embodiments of the disclosure, a dual fuel burner is disclosed as comprising: a first fuel burner comprising a plurality of fuel rail fingers connected in fluid communication with a first fuel rail, wherein each fuel rail finger comprises a plurality of combustion chambers, and wherein each combustion chamber comprises a combustion tube holder that at least partially envelops a combustion tube; a second fuel burner comprising a plurality of fuel rail fingers connected in fluid communication with a second fuel rail, and wherein each fuel rail finger of the second fuel burner comprises a plurality of combustion chambers; wherein the first fuel burner is configured to burn a first fuel, wherein the second fuel burner is configured to burn a second fuel, and wherein the plurality of fuel rail fingers of the first fuel burner are configured to integrate with the plurality of fuel rail fingers of the second fuel burner.

In other embodiments of the disclosure, a superheater truck is disclosed as comprising: a dual fuel burner, comprising: a first fuel burner comprising a plurality of fuel rail fingers connected in fluid communication with a first fuel rail, wherein each fuel rail finger comprises a plurality of combustion chambers, and wherein each combustion chamber comprises a combustion tube holder that at least partially envelops a combustion tube; and a second fuel burner comprising a plurality of fuel rail fingers connected in fluid communication with a second fuel rail, and wherein each fuel rail finger of the second fuel burner comprises a plurality of combustion chambers; wherein the first fuel burner is configured to burn a first fuel, wherein the second fuel burner is configured to burn a second fuel, and wherein the plurality of fuel rail fingers of the first fuel burner are configured to integrate with the plurality of fuel rail fingers of the second fuel burner.

In yet other embodiments of the disclosure, a method of heating a wellbore treatment fluid is disclosed as comprising: receiving wellhead gas from a wellbore in an apparatus comprising a first fuel burner assembly integrated with a second fuel burner assembly; combusting the wellhead gas in a first fuel burner; combusting a second fuel in the second fuel burner; heating a wellbore treatment fluid with heat produced by combusting the wellhead gas in the first fuel burner and the second fuel in the second fuel burner; and treating a wellbore with the heated wellbore treatment fluid.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
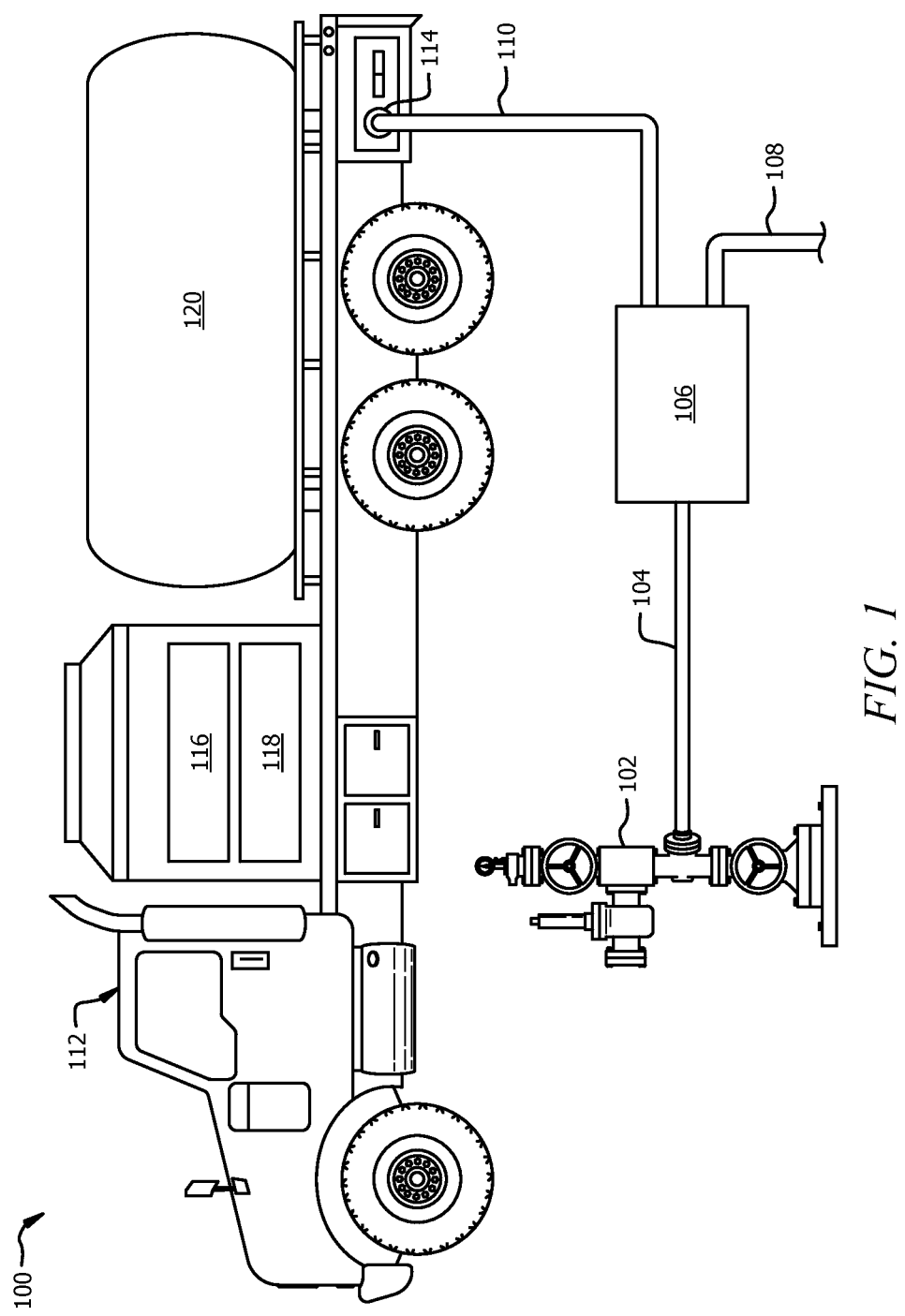
FIG. 1 is a schematic of a wellhead gas superheater system according to an embodiment of the disclosure.

Referring now to FIG. 1, a schematic of a wellhead gas superheater system 100 is shown according to an embodiment of the disclosure. The wellhead gas superheater system 100 may generally be configured to receive unrefined or refined wellhead gas produced from the wellhead 102 and burn the wellhead gas to heat water and/or other chemicals used for hydrocarbon production drilling, and/or well completion processes (i.e. fracking). Wellhead gas may be defined as any gas produced from a wellhead that has not been refined, processed, and/or chemically altered in any manner. Wellhead gas therefore is substantially the same as the natural gas when it is in the subterranean formation (e.g. mostly methane with some heavier hydrocarbons). In some instances, the wellhead gas may also comprise the same temperature and/or pressure as the gas when it is located in the subterranean formation. As wellhead gas is produced from the wellhead 102, a first flow line 104 is configured to receive the wellhead gas from the wellhead 102. The first flow line 104 may generally comprise any suitable pipeline, tubing, and/or other hollow vessel suitable for carrying, receiving, and/or transporting wellhead gas. The first flow line 104 is configured to carry the wellhead gas to a separator 106.

The separator 106 may generally comprise any device configured to receive wellhead gas and separate the gas to be used by the wellhead gas superheater system 100 from the produced oil and/or any other liquids produced from the wellhead 102. More specifically, the separator 106 may be configured to remove hydrocarbons and/or any other particulates in order to regulate, maximize, and/or provide a consistent British Thermal Unit (BTU) level in the wellhead gas to be used in the wellhead gas superheater system 100. A sufficient BTU level may generally comprise at least about 250 BTU per cubic foot, at least about 500 BTU per cubic foot, at least about 1,000 BTU per cubic foot, at least about 2,500 BTU per cubic foot, or at least about 3,500 BTU per cubic foot. In some embodiments, the separator may comprise a HIPOWER Unprocessed Gas Conditioning System Model FCS-25, FCS-50, FCS-100, FCS-250, or FCS-500, manufactured by Himoinsa Power Systems, Inc, or any other equivalent treater or separator from any other manufacturer. In some embodiments, the separator 106 may comprise a sales line 108. The sales line 108 may be used to collect natural gas liquids, heavy oils, and/or other byproducts from the separator 106 that are not commercially valuable and/or utilized within the wellhead gas superheater system 100. From the separator 106, the wellhead gas is passed through a second flow line 110 to the superheater truck 112. Similar to the first flow line 104, the second flow line 110 may also comprise any suitable pipeline, tubing, and/or other hollow vessel suitable for carrying, receiving, and/or transporting wellhead gas. It will be appreciated that the first flow line 104 and the second flow line 110 comprise a diameter of at least about 1.5" (38.1 millimeters (mm)). However, in some embodiments, the first flow line 104 and the second flow line 110 may comprise a diameter of at least about 2.0" (51 mm), and/or at least about 2.5" (63.5 mm). In alternative embodiments, the first flow line 104 and/or the second flow line 110 may comprise a diameter of at least about 0.5" (12.7 mm) up to about 24" (609.6 mm).

The superheater truck 112 may generally comprise at least one supply line union 114 that is configured to connect and/or couple to the second flow line 110 for receiving and/or importing the wellhead gas into the superheater truck 112. In some embodiments, however, the superheater truck 112 may comprise a plurality of supply line unions 114 and be configured to receive wellhead gas from a plurality of wellheads 102. From the supply line union 114, the wellhead gas may be carried by a supply line (not pictured, but discussed in greater detail later) and delivered to a wellhead gas burner 116. The wellhead gas burner 116 is generally configured to burn the wellhead gas produced from the wellhead 102. By burning the wellhead gas in the wellhead gas burner 116, heat produced from the combustion of the wellhead gas may be used to heat the water and/or other chemicals used in hydrocarbon production and/or well completion processes, including, but not limited to, fracking. The superheater truck 112 may also comprise a storage tank 120. In some embodiments, the wellhead gas burner 116 may also comprise a heat exchanger that improves heat transfer between the water and/or other chemicals and the wellhead gas burner 116 and/or a traditional gas burner 118. The traditional gas burner 118 may be configured to burn propane and/or diesel fuel to heat the water and/or other chemicals used for the aforementioned production and/or well completion processes. In some embodiments, and as will be discussed in greater detail herein, the traditional gas burner 118 may be used in conjunction with the wellhead gas burner 116, to supplement the wellhead gas burner 116, and/or in place of the wellhead gas burner 116. It will be appreciated that the wellhead gas burner 116 and the traditional gas burner 118 may be referred to as a dual fuel burner and/or a duel fuel frac heater.

In some embodiments, the wellhead gas superheater system 100 may not comprise a separator 106. In such embodiments, the first flow line 104 may be configured to carry the wellhead gas directly from the wellhead 102 to the supply line union 114 of the superheater truck 112. Further, while the wellhead gas burner 116 and the traditional gas burner 118 are shown mounted to and/or carried by the superheater truck 112, in some embodiments, the wellhead gas burner 116 and/or the traditional gas burner 118 may alternatively be a standalone burner unit and/or mounted on a skid or trailer. Additionally, it will be appreciated that in some embodiments a plurality of wellhead gas superheater systems 100 may be configured to receive wellhead gas produced from the wellhead 102 and burn the wellhead gas to heat water and/or other chemicals used for hydrocarbon production and/or well completion processes.

Figure 2:
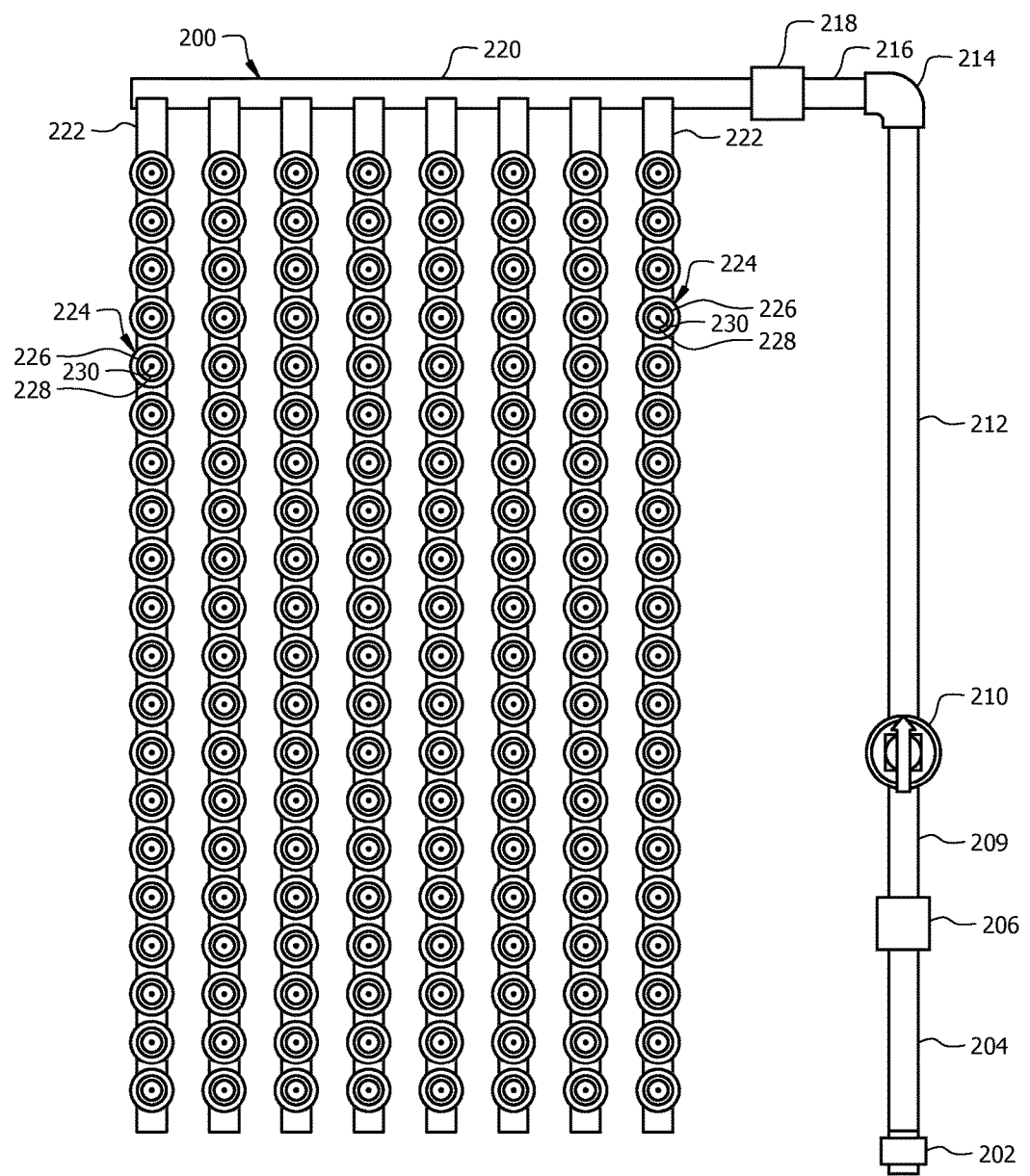
FIG. 2 is a schematic of a wellhead gas burner according to an embodiment of the disclosure.

Referring now to FIG. 2, a schematic of a wellhead gas burner 200 is shown according to an embodiment of the disclosure. Wellhead gas burner 200 may generally be substantially similar to the wellhead gas burner 116 in FIG. 1 and be capable of being used in the superheater truck 112 of the wellhead gas superheater system 100 of FIG. 1. Wellhead gas burner 200 generally comprises a supply line union 202, a plurality of valves 206, 218, a pressure regulator 210, a plurality of supply line sections 204, 208, 216 configured to carry wellhead gas through the wellhead gas burner 200, an expansion chamber 212, a fuel rail 220, a plurality of fuel rail fingers 222 that extend from the fuel rail 220, and a plurality of combustion chambers 224 attached to each fuel rail finger 222.

The supply line union 202 may generally be substantially similar to supply line union 114 in FIG. 1 and be configured to connect and/or couple a first supply line section 204 to a fluid flow line, such as the first flow line 104 and/or the second flow line 110 of FIG. 1. In some embodiments, the supply line union 202 may comprise a 2.0" (51 mm) hammer union, while the first supply line section 204 comprises a 2.0" (51 mm) diameter pipe. In alternative embodiments, the supply line union 202 and/or the first supply line section 204 may comprise a diameter of at least about 0.5" (12.7 mm) up to about 24" (609.6 mm). The wellhead gas burner 200 may also comprise a first valve 206 connected and/or coupled to the first supply line section 204 at an end opposite from the supply line union 202. The first valve 206 may be configured as a globe valve, a gate valve, a ball valve, and/or any other suitable shutoff valve that may substantially restrict and/or prevent fluid flow through the first valve 206 and/or the wellhead gas burner 200. In some embodiments, the first valve 206 may comprise a 2.0" (51 mm) valve. In alternative embodiments, the first valve 206 may comprise a diameter of at least about 0.5" (12.7 mm) up to about 24" (609.6 mm). The first valve 206 may generally be located between the first supply line section 204 and a second supply line section 208. Similar to the first supply line section 204, the second supply line section 208 may also comprise a 2.0" (51 mm) diameter pipe. Alternatively, in other embodiments, the second supply line section 208 may comprise a diameter of at least about 0.5" (12.7 mm) up to about 24" (609.6 mm).

The wellhead gas burner 200 may also comprise a pressure regulator 210. The pressure regulator 210 may be connected and/or coupled to the second supply line section 208 at an end opposite from the first valve 206. The pressure regulator 210 may generally be configured to regulate the pressure of the wellhead gas flowing through the wellhead gas burner 200. In some embodiments, the pressure regulator 210 may comprise a 0.374" (9.5 mm) orifice that substantially regulates the pressure of the wellhead gas flowing through the wellhead gas burner 200. The pressure regulator 210 may generally be connected to and/or coupled to the expansion chamber 212. In some embodiments, however, the wellhead gas burner 200 may not comprise a pressure regulator 210.

Because wellhead gas produced from a wellhead, such as the wellhead 102 in FIG. 1, can experience large pressure fluctuations, the expansion chamber 212 may generally be configured to accommodate, regulate, and/or control such pressure fluctuations in the wellhead gas. In some embodiments, the expansion chamber may accommodate wellhead gas pressures from about 5 pounds per square inch (psi) to about 15,000 psi. The expansion chamber 212 may also be configured to provide a sufficient volume for storing wellhead gas so that the flow of wellhead gas to the combustion chambers 224 remains uninterrupted. The expansion chamber 212 may also be configured to provide sufficient internal volume to allow for the wellhead gas to expand within the expansion chamber 212. Further, by configuring the expansion chamber 212 with a sufficient volume, the wellhead gas burner 200 may accommodate the pressure fluctuations from the wellhead and/or provide a smoother, more consistent flow of wellhead gas to components disposed downstream of the expansion chamber 212 despite the wellhead gas pressure and/or fluctuations from the wellhead. In some embodiments, the expansion chamber 212 may comprise a 2.0" (51 mm) diameter pipe and comprise a length of at least about 10 feet (3.048 meters). In embodiments where the expansion chamber comprises the 2.0" (51 mm) diameter pipe, the wellhead gas burner 200 may accommodate at least about one-hundred sixty combustion chambers 224 and a wellhead gas flow rate of at least about 35,000 cubic feet of gas per hour. In other embodiments, the expansion chamber 212 may comprise a 3.0" (76.2 mm) diameter pipe and comprise a length of at least about 10 feet (3.048 meters). In embodiments where the expansion chamber comprises the 3.0" (76.2 mm) diameter pipe, the wellhead gas burner 200 may accommodate at least about three-hundred combustion chambers 224 and a wellhead gas flow rate of at least about 90,000 cubic feet of gas per hour. In alternative embodiments, the expansion chamber 212 may comprise a diameter of at least about 0.5" (12.7 mm) up to about 24" (609.6 mm).

The wellhead gas burner 200 may also comprise a second valve 218. The second valve 218 may be substantially similar to the first valve 206 and be configured as a globe valve, a gate valve, a ball valve, and/or any other suitable shutoff valve that may substantially restrict and/or prevent fluid flow through the second valve 218 and/or the wellhead gas burner 200. In some embodiments, the second valve 218 may comprise a 2.0" (51 mm) valve. In alternative embodiments, the second valve 218 may comprise a diameter of at least about 0.5" (12.7 mm) up to about 24" (609.6 mm). The second valve may generally be connected to and/or coupled to the expansion chamber 212. However, in some embodiments, the second valve 218 may be connected and/or coupled to the expansion chamber 212 through a fitting 214 and a third supply line section 216. Similar to the first supply line section 204 and the second supply line section 208, the third supply line section 216 may also comprise a 2.0" (51 mm) diameter pipe. In alternative embodiments, the third supply line section 216 may comprise a diameter of at least about 0.5" (12.7 mm) up to about 24" (609.6 mm).

It will be appreciated that while a plurality of supply line sections 204, 208, 216 and only one fitting 214 are disclosed, in some embodiments the wellhead gas burner 200 may comprise a fewer or a greater number of supply line sections 204, 208, 216 and/or fittings 214 to accommodate a fewer or greater number of components and/or to route the supply line through a superheater truck, such as superheater truck 112 in FIG. 1. Further, it will be appreciated that the valves 206, 218 are included in the wellhead gas burner 200 for safety. Accordingly, in some embodiments, the wellhead gas burner 200 may only comprise one valve 206, 218. However, in other embodiments, the wellhead gas burner 200 may comprise more than two valves 206, 218. As one exemplary embodiment, in embodiments where the wellhead gas burner 200 comprises only valve 218, the supply line union 202 may be connected and/or coupled to the pressure regulator 210 via either the first supply line section 204 or the second supply line section 208. Still in some embodiments, it will be appreciated that no expansion chamber 212 may be used, and the pressure regulator 210 may be directly coupled in fluid communication with a third supply line 216 and/or the fuel rail 220. It will further be appreciated that the components configured to carry and/or transport the wellhead gas to the wellhead gas burner 200 may comprise substantially similar sizes that may comprise a diameter range from at least about 0.5" (12.7 mm) up to about 24" (609.6 mm).

The wellhead gas burner 200 also comprises a fuel rail 220. The fuel rail 220 may generally be connected to and/or coupled to the second valve 218. In some embodiments, the fuel rail 220 may comprise at least about 1.5" schedule 40 pipe. However, in some embodiments, the fuel rail 220 may comprise at least about 2.0" schedule 40 pipe and/or at least about 2.5" schedule 40 pipe. In yet other embodiments, the fuel rail 220 may comprise at least about 1.5" schedule 80 pipe, at least about 2.0" schedule 80 pipe, and/or at least about 2.5" schedule 80 pipe for high pressure wellhead gas burner 200 applications. In alternative embodiments, the fuel rail 220 may comprise a diameter of at least about 0.5" (12.7 mm) up to about 24" (609.6 mm).

The fuel rail 220 generally comprises a plurality of fuel rail fingers 222 mounted, secured, welded, and/or otherwise attached to the fuel rail 220. In some embodiments, the fuel rail 220 may comprise at least about eight fuel rail fingers 222. However, in other embodiments, the fuel rail 220 may comprise any number of fuel rail fingers 222 depending on the configuration of the wellhead gas burner 200. The fuel rail fingers 222 may also be in fluid communication with the fuel rail 220 and be configured to receive wellhead gas from the fuel rail 220. In some embodiments, the fuel rail fingers 222 may comprise at least about 1.0" schedule 40 pipe. However, in some embodiments, the fuel rail fingers 222 may comprise at least about 1.25" schedule 40 pipe and/or at least about 1.5" schedule 40 pipe. In yet other embodiments, the fuel rail fingers 222 may comprise at least about 1.0" schedule 80 pipe, at least about 1.25" schedule 80 pipe, and/or at least about 1.5" schedule 80 pipe for high pressure wellhead gas burner 200 applications. Alternatively, the fuel rail fingers 222 may comprise a diameter of at least about 0.5" (12.7 mm) up to about 24" (609.6 mm).

Each fuel rail finger 222 generally comprises a plurality of combustion chambers 224 mounted, secured, welded, and/or attached to each of the fuel rail fingers 222. Each of the plurality of combustion chambers 224 comprises a combustion tube holder 226, a combustion tube 228, and a combustion nozzle 230. The combustion chambers 224 may generally be configured to allow wellhead gas to exit the fuel rail fingers 222 and combust within the combustion chamber 224. It will be appreciated that in some embodiments, each fuel rail finger 222 comprises as many combustion chambers 224 as possible according to the length of the fuel rail fingers 222. Accordingly, in some embodiments, the combustion chambers 224 may be spaced at least about 3.5" (89 mm) apart as measured from the center of one combustion chamber 224 to the most adjacently located combustion chamber 224 and along the length of one of the fuel rail fingers 222. However, in other embodiments, the combustion chambers 224 may be spaced at any distance as measured from center to center along the length of the fuel rail finger 222 to accommodate the largest number of combustion chambers 224 on each fuel rail finger 222 based on the largest overall outer diameter of the combustion chambers 224 and/or the outer diameter of the combustion tube holder 226. Although not shown, the wellhead gas burner 200 may also comprise one or more igniters that facilitate ignition of the combustion process in the combustion chambers 224.

Figure 3:
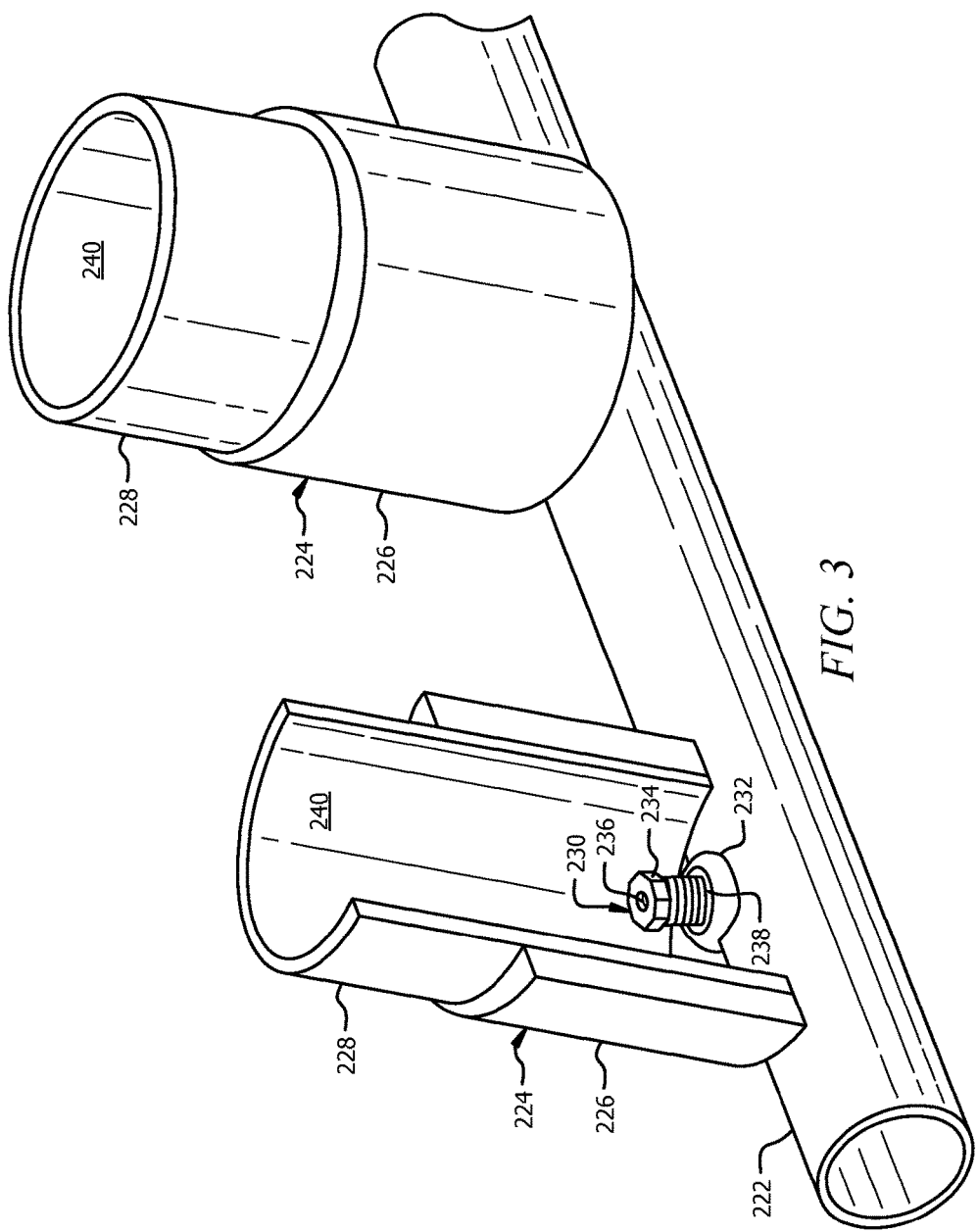
FIG. 3 is a detailed cutaway view of a combustion chamber mounted to a fuel rail finger of the wellhead gas burner of FIG. 2 according to an embodiment of the disclosure.

Referring now to FIG. 3, a detailed cutaway view of a combustion chamber 224 mounted to a fuel rail finger 222 of the wellhead gas burner 200 of FIG. 2 is shown according to an embodiment of the disclosure. As stated, each combustion chamber 224 comprises a combustion tube holder 226, a combustion tube 228, and a combustion nozzle 230. Each combustion tube holder 226 may generally be configured to accommodate and/or receive a combustion tube 228 within the inner diameter of the combustion tube holder 226 such that the combustion tube holder 226 partially, substantially, or completely envelops the combustion tube 228. Accordingly, the inner diameter of each of the combustion tube holders 226 may be smaller than the outer diameter of the combustion tube 228. In some embodiments, the combustion tube holders 226 may comprise at least about 2.0" schedule 40 pipe, while the combustion tubes 228 comprise about 1.5" schedule 40 pipe. However, in some embodiments, the combustion tube holders 226 may comprise at least about 2.5" schedule 40 pipe and/or at least about 3.0" schedule 40 pipe, while the combustion tubes 228 comprise about 2.0" schedule 40 pipe and/or 2.5" schedule 40 pipe, respectively. In yet other embodiments, the combustion tube holders 226 may comprise at least about 2.0" schedule 80 pipe, at least about 2.5" schedule 80 pipe, and/or at least about 3.0" schedule 80 pipe, while the combustion tubes 228 comprise 1.5" schedule 80 pipe, 2.0" schedule 80 pipe, and/or 2.5" schedule 80 pipe, respectively, for high pressure wellhead gas burner 200 applications.

Each combustion chamber 224 may be configured such that the combustion tube 228 may be longer than the combustion tube holder 226. The combustion tube holder 226 and the combustion tube 228 may generally be aligned on the end that substantially abuts the fuel rail finger 222. Accordingly, in some embodiments, the combustion tube holder 226 may comprise a length of at least about 2.0" (51 mm), while the combustion tube 228 may comprise a length of at least about 5.0" (127 mm). However, in other embodiments, the combustion tube holder 226 may comprise a length of at least about 2.0" (51 mm), while the combustion tube 228 comprises any length that is greater than the length of the combustion tube holder 226 and/or that is configured to provide the most efficient wellhead gas combustion for the wellhead gas burner 200.

The combustion nozzles 230 each generally comprise a threaded bung 232, a threaded nozzle 234, and an orifice 236 and are located substantially in the center of each associated combustion chamber 224. The threaded bung 232 may generally be welded to the fuel rail finger 222 and disposed over an opening and/or hole in the fuel rail finger 222. The threaded bung 232 comprises a threaded opening 238 that comprises threads that are complementary to threads on the outer surface of the threaded nozzle 234. The threaded nozzle 234 may be inserted into the complementary threaded opening 238 of the threaded bung 232 by rotatably inserting the threaded nozzle 234 into the threaded opening 238 of the threaded bung 232. The threaded nozzle 234 comprises an orifice 236 that extends through the threaded nozzle 234 substantially along the length of the threaded nozzle 234. The orifice 236 may generally be configured to control the amount of the wellhead gas, the pressure of the wellhead gas, and/or the flow rate of the wellhead gas entering the combustion chamber 224. In some embodiments, the orifice 236 may comprise at least about a #40 orifice (0.098", 2.49 mm). However, in other embodiments, the orifice 236 may comprise at least about a #30 orifice and/or at least about a #50 orifice. It will be appreciated that the orifice size may be larger than that of a traditional gas burner, such as traditional gas burner 118 in FIG. 1, which may produce a hotter flame as compared to such traditional gas burners. The orifice 236 may generally remain in fluid communication with the threaded bung 232 and/or the hole and/or opening in the fuel rail finger 222 to allow wellhead gas that flows through the fuel rail finger 222 to escape the fuel rail finger 222 through a fluid path that extends through the orifice 236 of the threaded nozzle 234 and into an internal cavity 240 of the combustion chamber 224 that is defined by the inner volume of the combustion tube 228. It is within the internal cavity 240 of the combustion chamber 224 that combustion of the wellhead gas occurs. Alternatively, as opposed to the threaded bung 232 and the threaded nozzle 234, each combustion nozzle 230 may comprise an orifice 236 that comprises a hole drilled in the fuel rail finger 222. In such embodiments, the orifices 236 may comprise at least about a #30 orifice up to about a #50 orifice.

Referring now to both FIGS. 2 and 3, in operation, the wellhead gas burner 200 may receive unrefined wellhead gas from a wellhead, such as wellhead 102 in FIG. 1, to heat water and/or other chemicals used for hydrocarbon production and/or well completion processes. In some embodiments, the wellhead gas may be passed through a separator, such as separator 106 in FIG. 1, prior to entering the wellhead gas burner 200. However, in other embodiments, a separator, such as separator 106, may not be used, and the wellhead gas may enter the wellhead gas burner 200 directly from the wellhead. The wellhead gas may enter the wellhead gas burner 200 through the supply line union 202. From the supply line union 202, the wellhead gas may flow through the first supply line section 204 to the first valve 206. The first valve 206 may be configured to restrict and/or prevent flow through the wellhead gas burner 200. After passing through the first valve 206, wellhead gas may flow through the second supply line section 208 to the pressure regulator 210. The pressure regulator 210 may be configured to restrict and/or prevent flow through the wellhead gas burner 200 and/or may be configured to control the pressure of the wellhead gas entering the expansion chamber 212. For example, in some embodiments, the pressure regulator 210 may prevent the pressure in the expansion chamber 212 from exceeding about 150 psi.

In the expansion chamber 212, the wellhead gas may expand. By expanding the wellhead gas in the expansion chamber 212, the wellhead gas may substantially fill the expansion chamber 212. Additionally, the pressure of the wellhead gas in the expansion chamber 212 may be less than the pressure of the wellhead gas in the first supply line section 204 and/or the second supply line section 208. By controlling the pressure of the wellhead gas entering and/or contained within the expansion chamber 212, pressure fluctuations from the wellhead may be neutralized, thereby allowing the flow rate of the wellhead gas through the remainder of the wellhead gas burner 200 to remain substantially constant and/or uninterrupted. Accordingly, by controlling the pressure of the wellhead gas in the expansion chamber 212 through the pressure regulator 210 and/or allowing the wellhead gas to expand within the expansion chamber 212, fluctuations in wellhead gas pressure may have a minimal effect on the delivery of wellhead gas to the combustion chambers 224. Further, it will be appreciated that the velocity of the wellhead gas through the expansion chamber 212 may be less than the velocity of the wellhead gas through the first supply line section 204 and/or the second supply line section 208.

In some embodiments, the expansion chamber 212 may allow the wellhead gas to be continuously combusted by lowering the velocity of the wellhead gas. It is theorized that lower wellhead gas velocities in the expansion chamber (and hence greater residence time) can normalize pressure and composition fluctuations in the wellhead gas and produce a more stable combustion process. Generally, the wellhead gas velocity in the expansion chamber 212 may be about 10% to about 70%, about 40% to about 60%, or about 50% less than the wellhead gas velocity in the first supply line section 204. For example, when the first supply line section 204 is 2" schedule 40 pipe, the expansion chamber 212 is 3" schedule 40 pipe, and the flow rate of the wellhead gas is 70,000 cubic feet per hour, the wellhead gas velocity in the supply line section 204 is about 208 feet per second (fps), whereas the wellhead gas velocity in the expansion chamber 212 is about 94.6 fps, a reduction of about 55%.

In other embodiments, the expansion chamber 212 may allow the wellhead gas to be continuously combusted by maintaining a consistent pressure of the wellhead gas. By maintaining consistent wellhead gas pressure in the expansion chamber 212, a more stable combustion process may be maintained. Generally, the wellhead gas pressure in the expansion chamber 212 may be about 5-25% less, about 8-12% less, or about 10% less than the wellhead gas pressure in the first supply line section 204 when no separator, such as separator 106 in FIG. 1, is used. However, the wellhead gas pressure in the expansion chamber 212 may be about 5-50% less, about 10-40% less, or about 25% less than the wellhead gas pressure in the first supply line section 204 when a separator, such as separator 106 in FIG. 1, is used.

From the expansion chamber 212, wellhead gas may be passed through a fitting 214 and/or a third supply line section 216 to the second valve 218. The second valve 218 may be configured to further restrict and/or prevent the flow of wellhead gas through the wellhead gas burner 200. After passing through the second valve 218, the wellhead gas may enter the fuel rail 220. Upon entering the fuel rail 220, wellhead gas may be substantially evenly distributed through the plurality of fuel rail fingers 222. In some embodiments, the pressure of the wellhead gas entering the fuel rail may be about 60 psi. Wellhead gas may flow through the fuel rail fingers 222 to the plurality of combustion chambers 224 and exit each of the plurality of fuel rail fingers 222 through a plurality of holes and/or openings in each of the fuel rail fingers 222 that are each in fluid communication with a respective orifice 236. Wellhead gas may thereby exit the fuel rail finger 222 through the orifice 236 and enter the internal cavity 240 of the combustion chamber 224, where the wellhead gas may be combusted to produce heat energy that may be used to heat water and/or other chemicals used for hydrocarbon production and/or well completion processes.

In a first preferred embodiment of the wellhead gas burner 200, the fuel rail 220 may comprise a 1.5" schedule 40 pipe, the fuel rail fingers 222 may comprise a 1.0" schedule 40 pipe, the combustion tube holder 226 may comprise a 2.0" inch schedule 40 pipe having a length of about 2.0" (51 mm), the combustion tube 228 may comprise a 1.5" schedule 40 pipe having a length of about 5.0" (127 mm), and the orifice 236 may comprise a #40 orifice. In a second preferred embodiment of the wellhead gas burner 200 that may be used for substantially higher pressure wellhead gas applications, the fuel rail 220 may comprise a 2.5" schedule 80 pipe, the fuel rail fingers 222 may comprise a 1.25" schedule 80 pipe, the combustion tube holder 226 may comprise a 3.0" inch schedule 80 pipe having a length of about 2.0" (51 mm), the combustion tube 228 may comprise a 2.5" schedule 80 pipe having a length of about 5.0" (127 mm), and the orifice 236 may comprise a #40 orifice.

Figure 4:
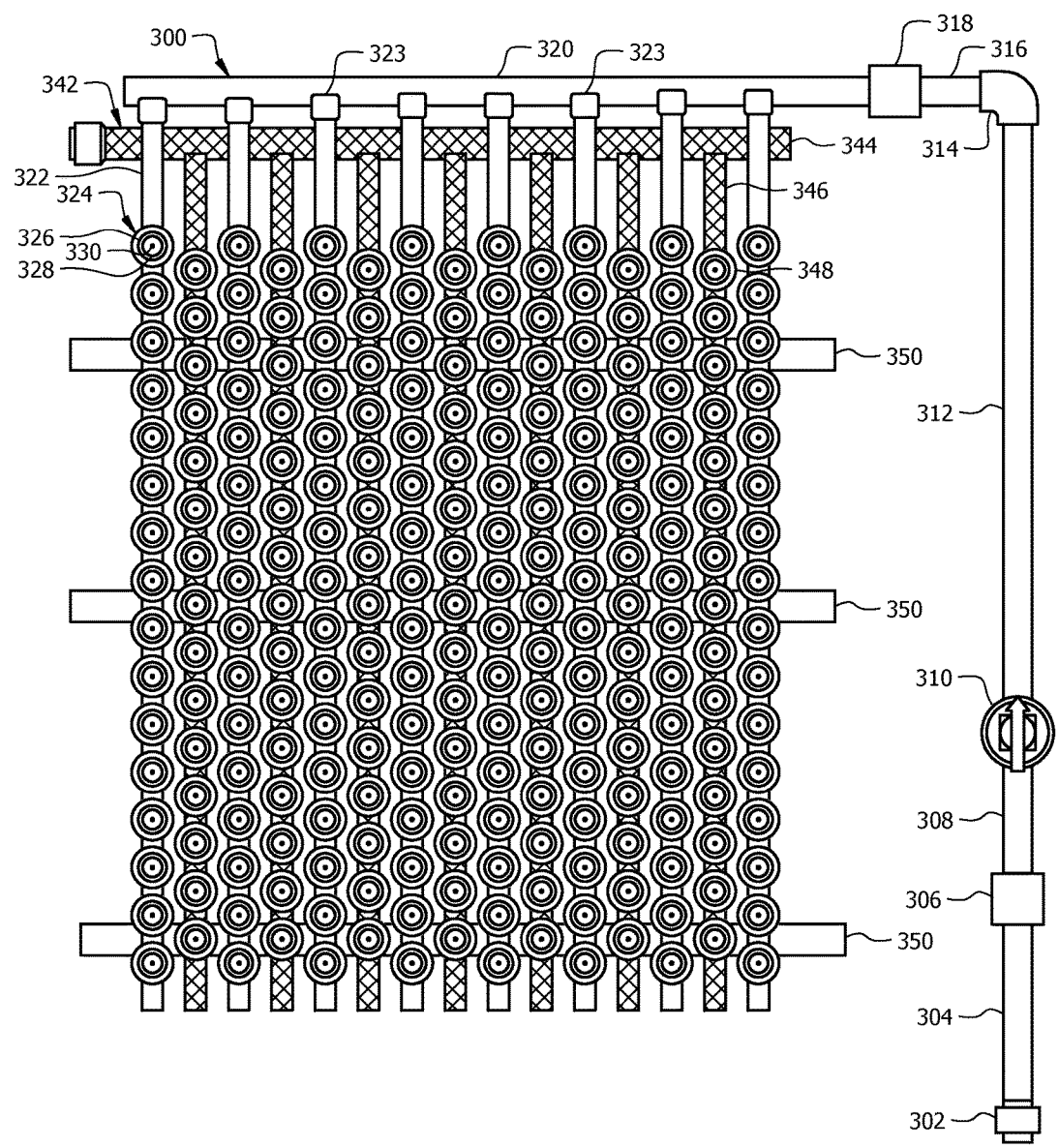
FIG. 4 is a schematic of a wellhead gas burner according to another embodiment of the disclosure.
Figure 5:
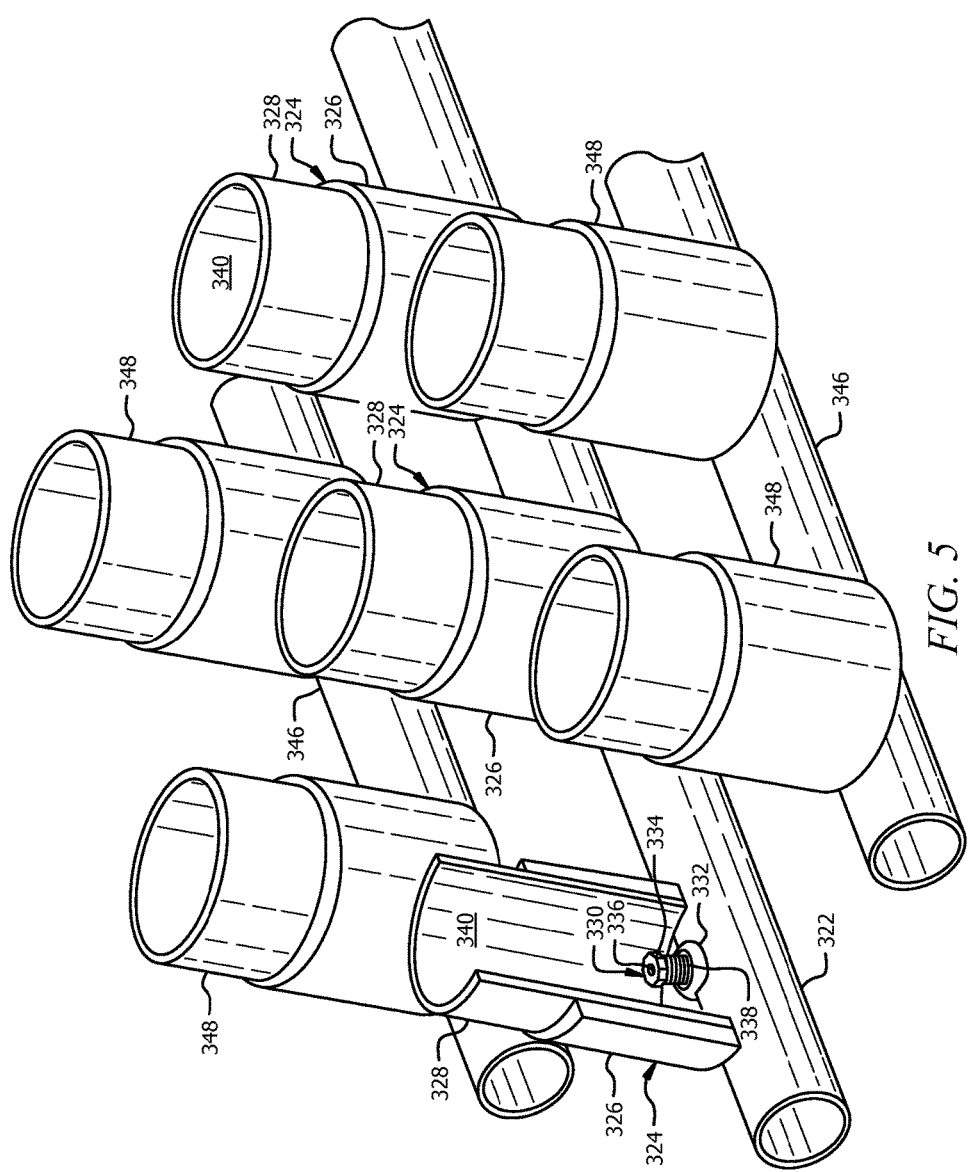
FIG. 5 is a detailed cutaway view of a combustion chamber mounted to a fuel rail finger of the wellhead gas burner of FIG. 4 according to an embodiment of the disclosure.

Referring now to FIGS. 4 and 5, a schematic of a wellhead gas burner 300 and a detailed cutaway view of a combustion chamber 324 mounted to a fuel rail finger 322 of the wellhead gas burner 300 is shown according to another embodiment of the disclosure. Wellhead gas burner 300 may generally be substantially similar to wellhead gas burner 116 in FIG. 1 and wellhead gas burner 200 of FIGS. 2-3 and be capable of being used in the superheater truck 112 of the wellhead gas superheater system 100 of FIG. 1 in a manner substantially similar to that of wellhead gas burner 200. Wellhead gas burner 300 comprises a supply line union 302, a first supply line section 304, a first valve 306, a second supply line section 308, a pressure regulator 310, an expansion chamber 312, a fitting 314, a third supply line section 316, a second valve 318, a fuel rail 320, a plurality of fuel rail fingers 322 attached to the fuel rail 320, a plurality of combustion chambers 324 comprising a combustion tube holder 326 and combustion tube 328 that are each attached to each fuel rail finger 322, and a plurality of combustion nozzles 330 that each comprise a threaded bung 332 welded to the fuel rail finger 322 and a threaded nozzle 334 that is threadably inserted into a threaded opening 338 of the threaded bung 332 and that comprises an orifice 336 in fluid communication with the threaded bung 332 and/or a hole and/or opening in the fuel rail finger 322 to allow wellhead gas that flows through the fuel rail finger 322 to escape the fuel rail finger 322 through the orifice 336 and into an internal cavity 340. However, wellhead gas burner 300 is configured to be integrated with a traditional gas burner 342 that may be substantially similar to the traditional gas burner 118 of FIG. 1. Further, wellhead gas burner 300 may also be configured to be used in the superheater truck 112 of the wellhead gas superheater system 100 of FIG. 1.

The traditional gas burner 342 may generally comprise a traditional fuel rail 344, a plurality of traditional fuel rail fingers 346 connected and/or coupled in fluid communication to the traditional fuel rail 344, and a plurality of traditional combustion chambers 348 on each of the plurality of traditional fuel rail fingers 346. Most generally, to integrate the wellhead gas burner 300 with the traditional gas burner 342, the fuel rail fingers 322 of the wellhead gas burner 300 may be disposed (e.g. alternatingly) with the traditional fuel rail fingers 346 of the traditional gas burner 342. Said differently, the fuel rail fingers 322 may be interstitially spaced between adjacent traditional fuel rail fingers 346. In some embodiments, wellhead gas burner 300 may comprise the same number of fuel rail fingers 322 as the traditional gas burner 342 comprises traditional fuel rail fingers 346. However, in other embodiments, the wellhead gas burner 300 may comprise a different number of fuel rail fingers 322 as compared to the traditional fuel rail fingers 346. In yet other embodiments, the wellhead gas burner 300 may comprise one more fuel rail finger 322 than the traditional gas burner 342 comprises traditional fuel rail fingers 346, such that the traditional fuel rail fingers 346 are substantially enveloped on each side by a fuel rail finger 322 and each traditional fuel rail finger 346 is substantially enveloped on each of two adjacent sides by a fuel rail finger 322 of the wellhead gas burner 300.

To facilitate integration of the wellhead gas burner 300 with the traditional gas burner 342, in some embodiments, the combustion chambers 324 of the wellhead gas burner 300 may be offset in a substantially longitudinal direction with respect to the length of a fuel rail finger 322 and/or the length of a traditional fuel rail finger 346. In some embodiments, the combustion chambers 324 may be offset a longitudinal offset distance equal to about one-half of the center-to-center distance between adjacent traditional combustion chambers 348. In other words, the combustion chambers 324 of the wellhead gas burner 300 may be disposed such that the combustion chamber 324 is substantially equidistant from each adjacent traditional combustion chamber 348. However, in other embodiments, the combustion chambers 324 may be disposed in a space between traditional combustion chambers 348 of adjacent traditional fuel rail fingers 346 such that the combustion chambers 324 and the traditional combustion chambers 348 are not substantially in contact.

Alternatively, the wellhead gas burner 300 may be integrated with the traditional gas burner 342, such that the fuel rail fingers 322 of the wellhead gas burner 300 are oriented perpendicularly with the traditional fuel rail fingers 346 of the traditional gas burner 342. In such embodiments, the fuel rail fingers 322, 346 of one gas burner 300, 342 may rest on top of the fuel rail fingers 322, 346 of the other burner 300, 342. Additionally, the combustion chambers 324 may be offset a longitudinal offset distance equal to about one-half of the center-to-center distance between adjacent traditional combustion chambers 348. In other words, the combustion chambers 324 of the wellhead gas burner 300 may be disposed such that the combustion chamber 324 is substantially equidistant from each adjacent traditional combustion chamber 348. However, in other embodiments, the combustion chambers 324 may be disposed in a space between traditional combustion chambers 348 of adjacent traditional fuel rail fingers 346 such that the combustion chambers 324 and the traditional combustion chambers 348 do not substantially overlap.

The wellhead gas burner 300 may generally comprise substantially the same number of combustion chambers 324 as the traditional gas burner 342 comprises traditional combustion chambers 348. However, in other embodiments, the wellhead gas burner 300 may comprise a different number of combustion chambers 324 as the traditional gas burner 342 comprises traditional combustion chambers 348. Additionally, in some embodiments, the components of the combustion chambers 324 and the components of the traditional combustion chambers 348 may comprise substantially similar sizes. However, in some embodiments, the components of the combustion chambers 324 and the components of the traditional combustion chambers 348 may comprise different sizes.

To further facilitate integration of the wellhead gas burner 300 with the traditional gas burner 342, wellhead gas burner 300 may comprise flexible finger connections 323. The flexible finger connections 323 are configured to connect and/or couple the fuel rail 320 in fluid communication with the plurality of fuel rail fingers 322. Each fuel rail finger 322 comprises a single flexible finger connection 323 to the fuel rail 320. In some embodiments, the flexible finger connection 323 may allow the fuel rail fingers 322 to move, float, and/or shift between the traditional fuel rail fingers 346 and with respect to the traditional fuel rail fingers 346. In some embodiments, the flexible finger connections 323 may comprise a flexible hose and/or a flexible tube that allows the fuel rail fingers 322 to individually move with respect to the fuel rail 320 and/or the traditional fuel rail fingers 346. However, in other embodiments, the flexible finger connections 323 may comprise a rigid hose and/or tubing coupled with a flexible fitting. Configuring the wellhead gas burner 300 with flexible finger connections 323 may provide for more versatile installation configurations as compared to a fixed, welded connection between the fuel rail 220 and the fuel rail fingers 222 in wellhead gas burner 200 of FIG. 2.

Because the flexible finger connections 323 may allow the fuel rail fingers 322 to move with respect to the fuel rail 320 and/or the traditional fuel rail fingers 346, burner supports 350 may be employed to provide support to the fuel rail fingers 322 and/or the traditional fuel rail fingers 346. The burner supports 350 may generally span across the fuel rail fingers 322, 346 to support the weight of the fuel rail fingers 322, 346 and/or prevent the fuel rail fingers 322 of the wellhead gas burner 300 from moving once integrated in a final installation position with the traditional fuel rail fingers 346 of the traditional gas burner 342. Further, the burner supports 350 may generally be disposed substantially perpendicularly to the fuel rail fingers 322 and/or the traditional fuel rail fingers 346.

Still referring to FIGS. 4-5, in operation, the wellhead gas burner 300 may receive wellhead gas from a wellhead, such as wellhead 102 in FIG. 1, and be configured to operate in a substantially similar manner to the operation of the wellhead gas burner 200 in FIGS. 2-3. The wellhead gas burner 300 may generally be configured as the primary source of thermal energy to heat water and/or other chemicals used for hydrocarbon production and/or well completion processes, while the traditional gas burner 342 may be configured as a supplemental source of thermal energy. In some embodiments, at least about 150 psi of wellhead gas pressure is needed to operate the wellhead gas burner 300. When the wellhead gas pressure drops below about 150 psi, the traditional gas burner 342 may be operated to burn methane, ethane, propane, butane, gasoline, diesel, liquefied natural gas (LNG), natural gas liquids (NGLs), wellhead gas, and/or any other appropriate fuel source to provide supplemental heat to heat well completion fluids until the wellhead gas pressure increases to at least about 150 psi. Additionally, in some embodiments, wellhead gas may not be used. Instead, any two fuels may be used in the wellhead gas burner 300 and the traditional gas burner 342 (e.g. propane and LNG). Still further, in some embodiments, if the wellhead gas provides less than about 3,500 BTU per cubic foot, the traditional gas burner 342 may be operated to burn any other fuel to provide supplemental heat to heat well completion fluids. In other embodiments, however, the traditional gas burner 342 may be operated to provide supplemental heat when the wellhead gas provides less than about 3,500 BTU per cubic foot. In yet other embodiments, however, the wellhead gas burner 300 may be operated simultaneously with the traditional gas burner 342 to provide an additional amount of heat.

In a preferred embodiment of the wellhead gas burner 300, the fuel rail 320 may comprise a 1.5" schedule 40 pipe, the fuel rail fingers 322 may comprise a 1.0" schedule 40 pipe, the combustion tube holder 326 may comprise a 2.0" inch schedule 40 pipe having a length of about 2.0" (51 mm), the combustion tube 328 may comprise a 1.5" schedule 40 pipe having a length of about 5.0" (127 mm), and the orifices 336 may comprise a #40 orifice. Further, it will be appreciated that the orifices 336 of the wellhead gas burner 300 may, at least in some embodiments, comprise a larger orifice diameter than orifices of the traditional gas burner 342. For example, the orifices 336 of the wellhead gas burner 300 may comprise a #40 orifice while the orifices of the traditional gas burner 342 comprise a #50 orifice. Alternatively, as opposed to the threaded bung 332 and the threaded nozzle 334, each combustion nozzle 330 may comprise an orifice 336 that comprises a hole drilled in the fuel rail finger 346. In such embodiments, the orifices 336 may comprise at least about a #30 orifice up to about a #50 orifice.

Figure 6:
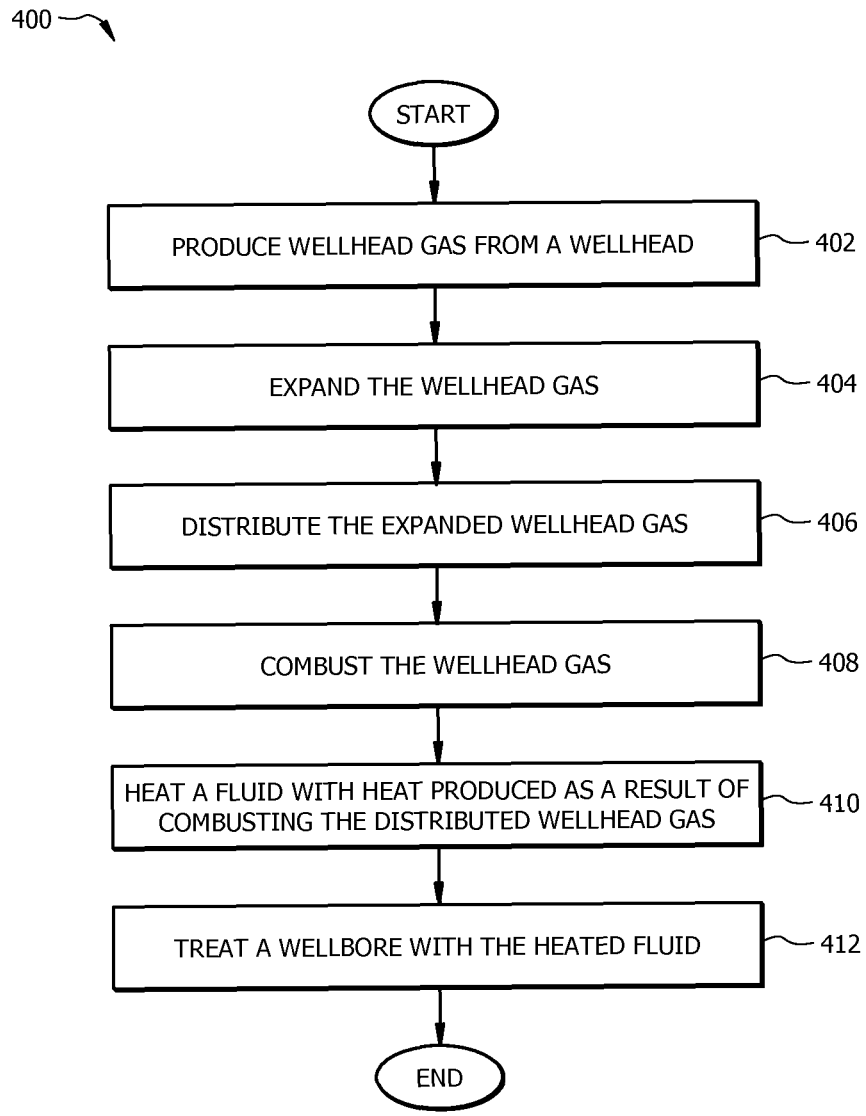
FIG. 6 is a flowchart of a method of burning wellhead gas according to an embodiment of the disclosure.
Figure 2:
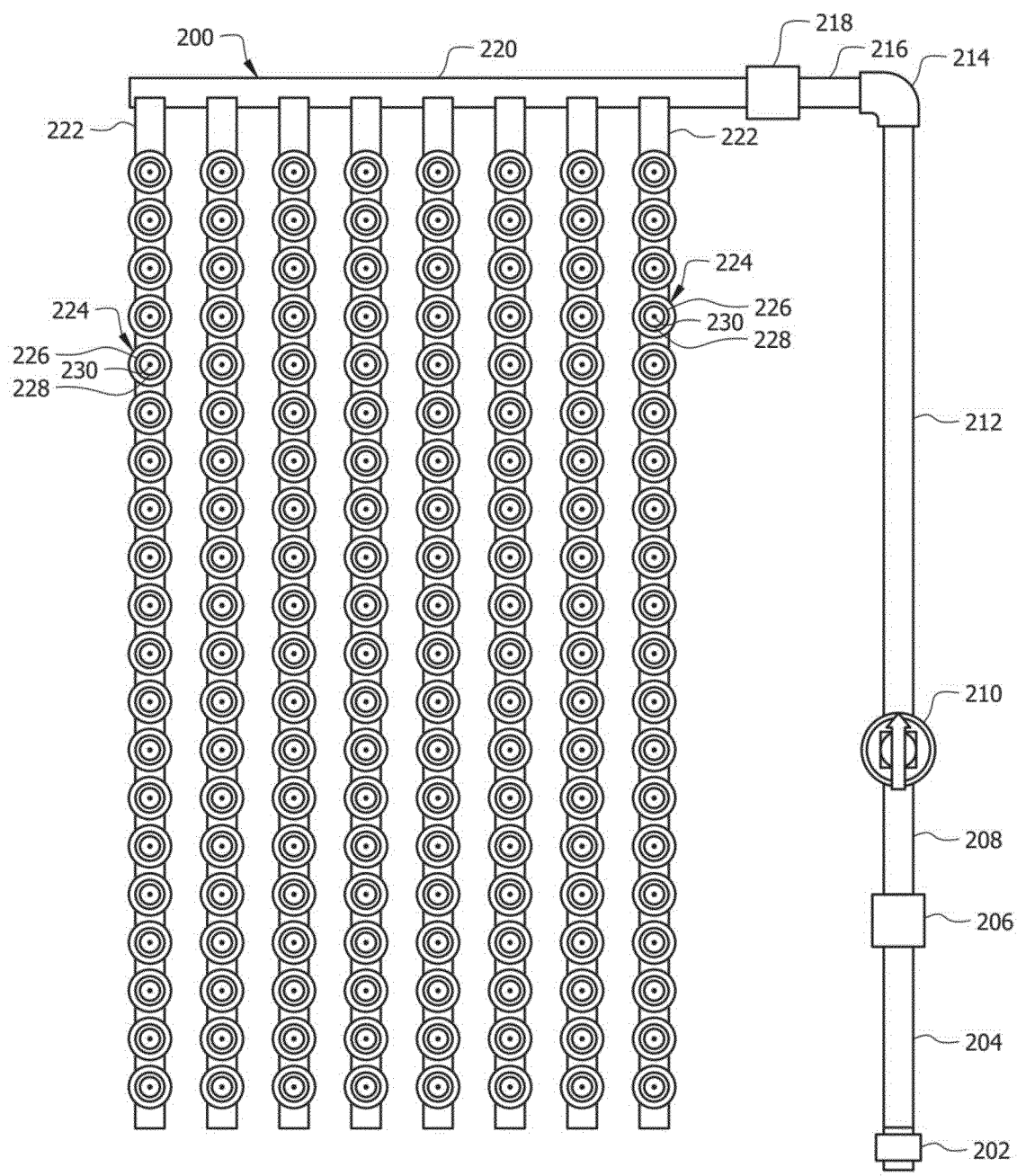

Referring now to FIG. 6, a flowchart of a method 400 of burning wellhead gas is shown according to an embodiment of the disclosure. The method 400 may begin at block 402 by producing wellhead gas from a wellbore. The method 400 may continue at block 404 by expanding the wellhead gas. In some embodiments, this may be accomplished by flowing the wellhead gas through a pressure regulator and/or an expansion chamber. In some embodiments, expanding the wellhead gas may comprise reducing the pressure of the wellhead gas. The method 400 may continue at block 406 by distributing the expanded wellhead gas. In some embodiments, distributing the wellhead gas may be accomplished by flowing the wellhead gas through a fuel rail that is in fluid communication with a plurality of fuel rail fingers. In some embodiments, the wellhead gas may be further distributed from each fuel rail finger to a plurality of combustion chambers. The method 400 may continue at block 408 by combusting the distributed wellhead gas. In some embodiments, the wellhead gas may be combusted by flowing the wellhead gas through a plurality of orifices into a plurality of combustion chambers. The method 400 may continue at block 410 by heating a fluid with the heat produced as a result of combusting the distributed wellhead gas. However, in some embodiments, the wellhead gas burner may be integrated with a traditional gas burner. In such embodiments, the method 400 may include operating the traditional gas burner when the pressure of the gas produced from the wellhead drops below about 150 psi and/or when the BTU per cubic foot output from the wellhead gas burner drops below about 3,500 BTU per cubic foot. However, in some embodiments, the wellhead gas burner and the traditional burner may be operated simultaneously. The method 400 may conclude at block 412 by treating the wellbore with the heated fluid. In some embodiments, treating the wellbore may comprise using the heated fluid in a hydraulic fracturing process.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc., greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A dual fuel burner, comprising:
   a first fuel burner comprising a first fuel rail and a plurality of first fuel rail fingers connected in fluid communication with the first fuel rail, wherein each first fuel rail finger comprises a plurality of first combustion chambers, wherein the first combustion chambers each comprise a cylindrical combustion tube having an interior volume comprising a center portion and an annular portion, wherein the center portion and the annular portion are aligned with a cylindrical axis of the cylindrical combustion tube, wherein the first fuel burner is configured to burn a first fuel up flowing the first fuel up from a bottom of the center portion, and wherein air flows up from a bottom of at least part of the annular portion; and
   a second fuel burner comprising a second fuel rail and a plurality of second fuel rail fingers connected in fluid communication with the second fuel rail, wherein each second fuel rail finger comprises a plurality of second combustion chambers, wherein the second fuel burner is configured to burn a second fuel that is different than the first fuel.

2. The dual fuel burner of claim 1, wherein each of the first combustion chambers further comprises a combustion tube holder that is attached to the first fuel rail, and wherein one of the cylindrical combustion tubes is attached to the combustion tube holder.

3. The dual fuel burner of claim 2, wherein each of the cylindrical combustion tubes extends further from its first fuel rail finger than each of the combustion tube holders.

4. The dual fuel burner of claim 1, wherein each of the first fuel rail fingers are movable relative to the first fuel rail.

5. The dual fuel burner of claim 1, wherein the first fuel is wellhead gas, and wherein the second fuel is at least one of propane, butane, gasoline, diesel, liquefied natural gas (LNG), and natural gas liquids (NGLs).

6. The dual fuel burner of claim 5, wherein the second fuel burner is configured to operate when the first fuel burner supplies less than about 3,500 British Thermal Units (BTU) per cubic foot.

7. The dual fuel burner of claim 5, wherein the second fuel burner is configured to operate when a pressure of the wellhead gas drops below about 1,000 pounds per square inch (psi).

8. The dual fuel burner of claim 5, wherein the first fuel burner and the second fuel burner are configured to operate simultaneously.

9. The dual fuel burner of claim 1, wherein each of the first fuel burner and the second fuel burner are mounted to at least one of a superheater truck, a trailer, a frac heater unit, and a skid.

10. The dual fuel burner of claim 1, wherein the first fuel rail fingers are interstitially spaced with the second fuel rail fingers.

11. The dual fuel burner of claim 1, wherein the first fuel rail fingers comprise a proximate end and a distal end, wherein the first fuel rail connects to the first fuel rail fingers at the proximate end, and wherein the second fuel rail is closer to the proximate end than the distal end.

12. The dual fuel burner of claim 1, wherein each first combustion chamber comprises a fuel nozzle in fluid communication with one of the first fuel rail fingers, and wherein the cylindrical combustion tube does not contact the fuel nozzle.

13. The dual fuel burner of claim 12, wherein the fuel nozzle is positioned within the first combustion chamber such that part of the cylindrical combustion tube is positioned below the fuel nozzle.

14. The dual fuel burner of claim 2, wherein each of the combustion tube holders at least partially envelope one of the cylindrical combustion tubes.

15. The dual fuel burner of claim 2, wherein each of the combustion tube holders comprise a 3 o'clock position, a 6 o'clock position, a 9 o'clock position, and a 12 o'clock position, wherein each of the combustion tube holders are attached to the first fuel rail at the 3 o'clock position and the 9 o'clock position, and wherein the air flows into the cylindrical combustion tube at the 6 o'clock position and the 12 o'clock position.

16. The dual fuel burner of claim 2, wherein each of the combustion tube holders has an inner diameter that is larger than an outer diameter of the cylindrical combustion tube.

17. The dual fuel burner of claim 2, wherein each of the combustion tube holders does not contact the first fuel or the second fuel.

18. The dual fuel burner of claim 2, wherein each first combustion chamber comprises a fuel nozzle in fluid communication with one of the first fuel rail fingers, and wherein the combustion tube holder does not contact the fuel nozzle.

19. The dual fuel burner of claim 18, wherein the fuel nozzle is positioned within the first combustion chamber such that part of the combustion tube holder is positioned below the fuel nozzle.

20. The dual fuel burner of claim 1, wherein the first fuel is not mixed with air prior to entering the first combustion chambers.

* * * * *

UNITED STATES PATENT AND TRADEMARK OFFICE
CERTIFICATE OF CORRECTION

PATENT NO. : 9,995,122 B2
APPLICATION NO. : 14/713677
DATED : June 12, 2018
INVENTOR(S) : Paul Briggs It is certified that error appears in the above-identified patent and that said Letters Patent is hereby corrected as shown below:

In the Drawings

Delete Drawing Sheet 2, Fig. 2 and replace with the attached Drawing Sheet 2, Fig. 2

In the Specification

Column 3, Line 33 replace "Inc," with --Inc.--

In the Claims

Claim 1, Column 14, Line 55 replace "up" with --by--

Claim 2, Column 14, Line 67 replace "comprises" with --comprise--

Claim 3, Column 15, Line 5 delete "its"

Signed and Sealed this
Twenty-first Day of August, 2018

Andrei Iancu
*Director of the United States Patent and Trademark Office*